United States Patent

[11] 3,590,673

| [72] | Inventors | Gerhard Foll;<br>Helmut Link, both of Esslingen (Neckar),<br>Germany |
|---|---|---|
| [21] | Appl. No | 852,717 |
| [22] | Filed | Aug. 25, 1969 |
| [45] | Patented | July 6, 1971 |
| [73] | Assignee | Index-Werke K G., Hahn & Tessky<br>Esslingen, (Neckar), Germany |
| [32] | Priority | Aug. 31, 1968 |
| [33] | | Germany |
| [31] | | P 17 77 070.6 |

[54] AUTOMATIC TURRET LATHE
28 Claims, 6 Drawing Figs.

[52] U.S. Cl.................................................. 82/21,
82/21 B, 82/34 D, 29/46, 74/826
[51] Int. Cl......................................................... B23b 21/00
[50] Field of Search........................................... 82/21 A, 21
B; 29/42—44, 46; 74/813, 822, 826

[56] References Cited
UNITED STATES PATENTS
2,673,388  3/1954  Retz............................ 29/48.5
2,777,190  1/1957  Sundt........................... 29/46
3,024,520  3/1962  Pulman........................ 29/44

*Primary Examiner*—Leonidas Vlachos
*Attorney*—Michael S. Striker

ABSTRACT: An automatic turret lathe wherein the carriage is reciprocable from a retracted position to several forward positions and supports an indexible turret for a given number of tool holders. The carriage is reciprocated by a toothed rack which is movable between two end positions and transmits motion to the carriage during a portion of its forward movement by way of one of several adjustable threaded bolts which are indexible with reference to the carriage and one of which is in registry with a dead stop to arrest the the carriage in that forward position which is best suited for treatment of a workpiece by the tool in the corresponding tool holder. The turret is indexible in response to indexing of a support for the bolts. A locking device which prevents indexing of the turret in each forward position of the carriage is disengaged by the rack while the latter moves relative to the carriage.

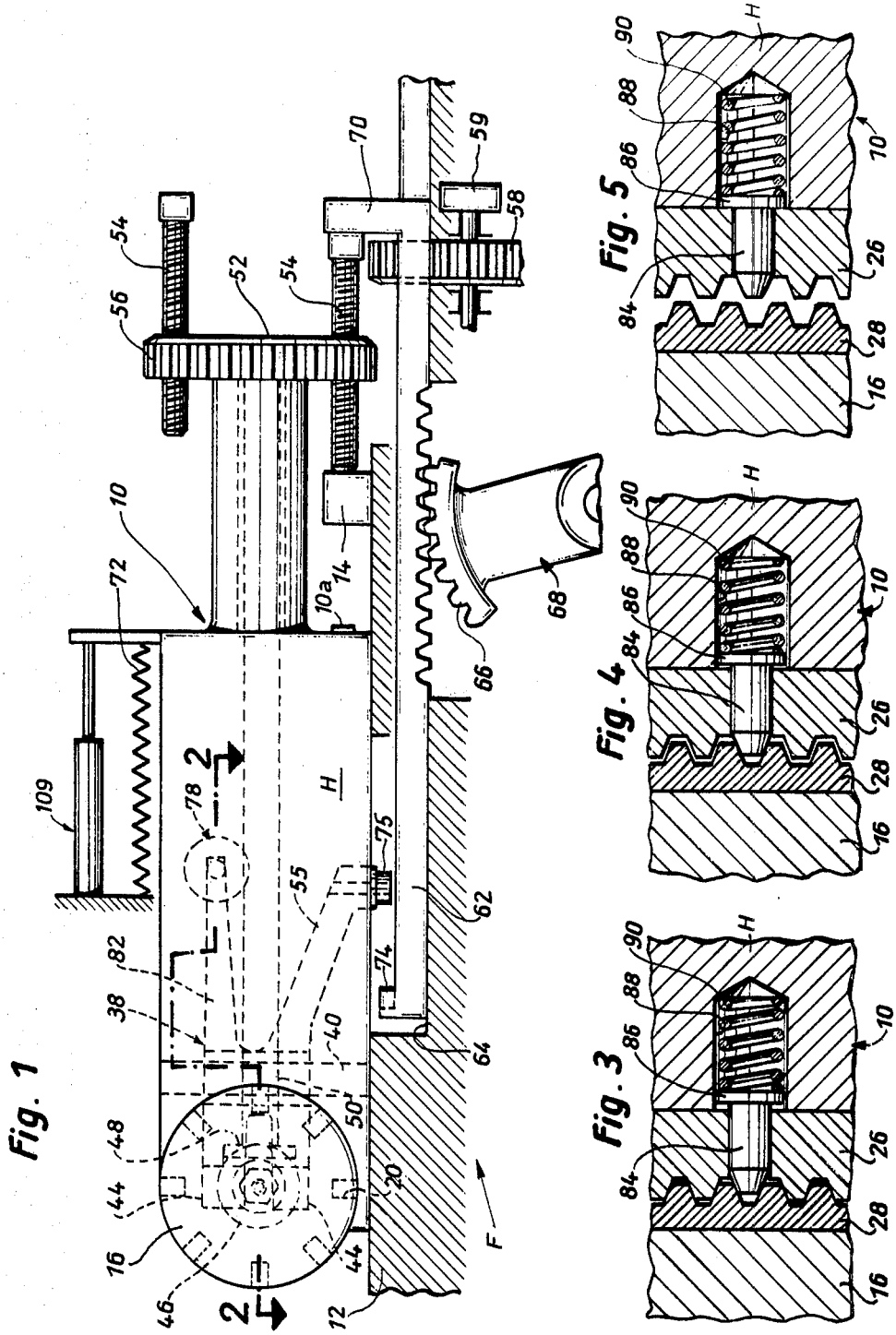

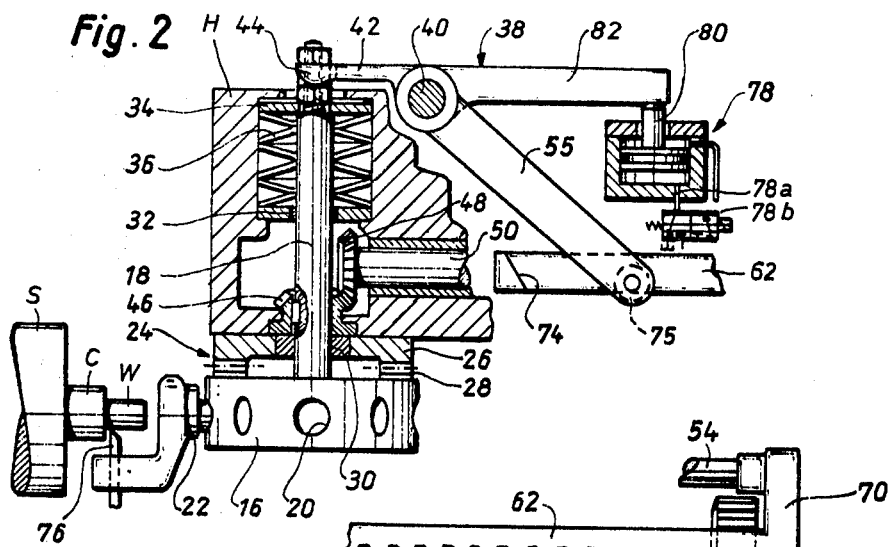
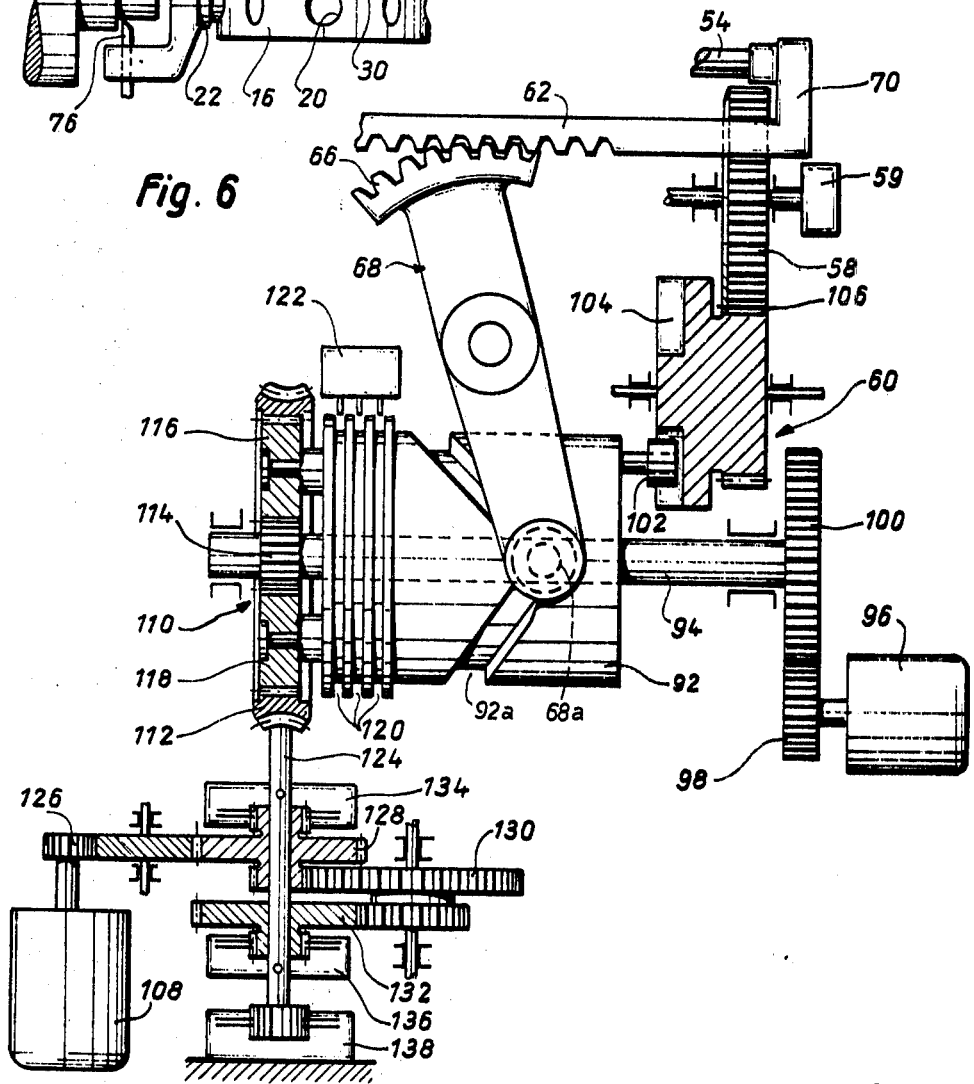

3,590,673

1

AUTOMATIC TURRET LATHE

BACKGROUND OF THE INVENTION

The present invention relates to machine tools in general, and more particularly to lathes or analogous machine tools wherein a turret or a like tool support is indexible and reciprocable with reference to the workpiece. Still more particularly, the invention relates to improvements in automatic turret lathes or analogous machine tools.

It is already known to mount the turret of a turret lathe on a carriage which is reciprocable along bedways through the intermediary of a rack which receives motion from a rotary cam. As a rule, the cam effects angular movements of a lever which carries a gear segment in mesh with the rack. A drawback of such machine tools is that they must be furnished with a large number of cams, one for each type of workpiece or for each type of operation which is to be performed with the lathe. Attempts to reduce the number of spare cams include the provision of a large number of cam sections mounted adjacent to each other on a common shaft and each movable to an operative position in which it can influence movements of the turret with reference to the work. Such proposal failed to find widespread acceptance because the cam sections are expensive and occupy too much room in the turret lathe. Also, the control system which must be provided to effect automatic movements of selected cam sections to operative positions is quite complicated, expensive and prone to malfunction.

SUMMARY OF THE INVENTION

An object of the invention is to provide a novel and improved mechanism which can move the turret of a lathe with reference to the work and which need not embody more than one cam despite the fact that the turret can be fed within a wide range of distances.

Another object of the invention is to provide a mechanism which can be rapidly and accurately adjusted to insure that the carriage for the turret can cover a preselected distance and which further insures that the turret can cover a desired distance in each of its angular positions.

A further object of the invention is to provide a turret lathe wherein a single cam suffices to effect reciprocatory movements of a carriage for the turret through the intermediary of a rack and in such a way that the rack can move the turret through any desired range of distances with reference to the work.

An additional object of the invention is to provide a novel indexing, locking and disengaging mechanisms for the turret of a turret lathe and to provide the lathe with novel means which insures that the tools carried by the turret can be disengaged from workpieces without leaving any scratch marks and in automatic response to preparation for retraction of the carriage.

An ancillary object of the invention is to provide a novel operative connection between the mechanism which reciprocates the turret and the carriage which supports the turret on or in the frame of a turret lathe or an analogous machine tool.

The invention is embodied in a machine tool, particularly in an automatic turret lathe, which comprises a frame, a carriage reciprocably mounted in the frame for movement between a retracted position and several forward positions, a feeding unit which serves to reciprocate the carriage and includes a toothed rack or another suitable driving member reciprocable between two fixed end positions and a mechanism for moving the driving member whereby the latter moves the carriage from retracted position to one of the forward positions during movement from one to the other end position, stop means provided on the frame, indexible supporting means provided on the carriage, and a plurality of adjustable abutments provided on and each movable by the supporting means to an operative position of registry with the stop means and in the path of movement of the driving member so that, while moving from the one to the other end position, the driving member entrains the carriage from retracted position to that forward position in which the abutment which dwells in operative position engages the stop means. Each abutment can be adjusted independently of the other abutments.

The carriage supports an indexible turret or an analogous tool support which is preferably indexed in response to indexing of the supporting means for the abutments and is normally held against indexing movement by a locking device which is operative at least when the carriage dwells in its forward position.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWING

FIG. 1 is a schematic fragmentary partly elevational and partly longitudinal vertical sectional view of a turret lathe which embodies the invention;

FIG. 2 is a horizontal sectional view as seen in the direction of arrows from the line 2-2 of FIG. 1;

FIG. 3 is a fragmentary sectional view of the locking device for the turret, showing the parts of this device in operative positions;

FIG. 4 is a similar fragmentary sectional view but showing the parts of the locking device in partly disengaged positions;

FIG. 5 is a similar fragmentary sectional view but showing the parts of the locking device in fully disengaged positions; and FIG. 6 is a schematic partly elevational and partly sectional view of the device which effects reciprocatory and indexing movements of the turret.

DESCRIPTION OF THE PREFERRED EMBODIMENTS

Referring first to FIG. 1, there is shown a portion of a turret lathe comprising a carriage in the form 112 a saddle 10 which is reciprocable in bedways 12 provided therefor in the machine frame F. The frame F is further provided with a fixed dead stop 14 which can arrest the saddle 10 in one of several forward positions. The housing H of the saddle 10 mounts a tool support here shown as a turret 16 whose shaft 18 (FIG. 2) 107 is rotatable about a horizontal axis. The turret 16 is cylindrical and its peripheral surface is provided with eight equidistant radial recesses or sockets 20 for tool holders 22 (one shown in FIG. 2). The numeral 24 denotes a locking device which can releasably hold the turret 16 in selected angular positions to thereby place a selected tool 76 (see FIG. 2) into requisite position with reference to a workpiece W which is held in the chuck C of a rotary work-supporting spindle S. The arrangement is such that one of the sockets 20 is coaxial with the spindle S in each of the eight angular positions of the turret 16. The locking device 24 comprises a ring gear 26 which is affixed to the housing H of the saddle 10 and a second ring gear 28 which is coaxial with the gear 26 and is affixed to the turret 16. The shaft 28 is shiftable axially to move the teeth of the gear 28 into and out of mesh with the teeth of the gear 26. Certain other details of the locking device will be described in connection with FIGS. 3 to 5.

The shaft 18 of the turret 16 is rotatable and reciprocable in bearings 30 and 32 provided therefor in the housing H of the saddle 10. The rear end of the shaft 16 is rigidly connected with a motion transmitting plate or disc 34 which serves as a retainer for a biasing means including a package 36 of dished springs accommodated in the interior of the housing H and tending to move the shaft 18 upwardly, as viewed in FIG. 2, so as to maintain the teeth of the gear 28 in mesh with the teeth of the gear 26. The springs of the package 36 are of annular shape and surround the median portion of the shaft 18; this package also forms part of the blocking device 24. The means for disengaging the locking device 24 comprises a lever 38 which is pivotable in the housing H about a vertical pivot member 40 and comprises a bifurcated arm 42 provided with prongs 44 (best shown in FIG. 1) which straddle the shaft 18 behind the plate 34. When the lever 38 is pivoted in a counterclockwise direction, as viewed in FIG 2, the prongs 44 cause the plate 34 to shift the shaft 18 and turret 16 downwardly to thereby disengage the gear 28 from the gear 26 and to thus permit indexing of the turret to a different angular position. The means for indexing the turret 16 comprises a bevel gear 46 which is secured to the shaft 18 and mates with a bevel gear 48 on a rotary shaft 50. The disengaging lever 38 includes a second arm 55 whose function will be described hereinbelow.

The shaft 50 forms part of the indexing means for the turret 16 and performs additional novel functions. To this end, the rear or right-hand end of the shaft 50 carries a supporting member 52 which serves to support several abutments in the form of threaded bolts 54 (only two shown in FIG. 1). The number of these bolts equals the number of sockets 20 in the turret 16 and each thereof is adjustable with reference to the supporting member 52 in parallelism with the axis of the shaft 50. The bolts 54 are equidistant from each other and each thereof assumes an operative position of registry with the dead stop 14 when the corresponding socket 20 is aligned with the spindle S. That bolt 54 which is moved to the operative position determines the extent of forward movement of the saddle 20 along the bedways 12. The supporting member 52 is a gear having an annulus of gear teeth 56 and can be moved into and away from mesh with an indexing gear 58 of a feeding unit 60 which can move the saddle 20 forwardly along the ways 23 to advance the turret 16 toward the spindle S.

The feeding unit 60 further includes a driving member here shown as a rack 62 which has limited freedom of lengthwise movement with reference to the saddle 10 and is reciprocable between two end positions in guide means 64 provided therefor in the frame F at a level below the saddle 10. The guide means 64 for the rack 62 is parallel to the bedways 12 for the saddle 10. The teeth of the rack 62 mate with the teeth of a gear segment 66 which is mounted on or is integral with the upper arm of a two-armed lever 68. The feeding unit 60 also comprises a cylinder cam 92 which can effect oscillatory movements of the lever 68 in accordance with a predetermined schedule. Movability of the rack 62 with reference to the saddle 10 constitutes a novel and advantageous feature of the present invention. The rear end portion of the rack 62 is provided with an upwardly extending pusher 70 adapted to engage that bolt 54 which is held in operative position and to move the bolt (and hence the saddle 20 and turret 16) toward the spindle S to the extent determined by the axial position of such bolt with reference to the supporting member 52. The forward movement of the saddle 20 and turret 16 is terminated when the bolt 54 reaches the stop 14.

FIG. 1 shows that the (lowermost) bolt 54 which is in operative position already abuts against the stop 14 and that the pusher 70 of the rack 62 abuts against the head of such lowermost bolt. This is the left-hand end position of the rack 62 and such end position does not depend on the axial positions of bolts 54 with reference to the supporting member 52 because the forward travel of the rack 62 ends invariably when the bolt 54 which is held in operative position engages the stop 14 and is also engaged by the pusher 70. The length of strokes performed by the rack 62 and the extent of oscillatory movements performed by the lever 68 is always the same because the bolts 54 are of identical axial length; however, such strokes of the rack 62 can cause shorter or longer forward movements of the saddle 10 and turret 16 because the position of the supporting member 52 with reference to that bolt 54 which is held in operative position can vary within a wide range, namely, within a range whose length almost equals the length of the stem of a bolt 54. The means for returning the saddle 10 and turret 16 to retracted positions (when permitted by the rack 62 and its pusher 70) comprises a helical spring 72 which tends to maintain a projection 10a of the housing H in abutment with the stop 14.

In accordance with a feature of the invention, the rack 62 also serves to effect unlocking of the turret 16 by way of the disengaging lever 38. The arm 55 of the lever 38 carries a roller follower 75 which can be engaged by a cam 74 at the forward end of the rack 62 when the rack travels rearwardly with reference to the saddle 10 and when the projection 10a of the housing H already abuts against the stop 14. Thus, the lever 68 can move the rack 62 to the right, as viewed in FIG. 1, to such an extent that the pusher 70 moves away from the head of that bolt 54 which is held in operative position and that the cam 74 thereupon engages the follower 75 to pivot the lever 38 in a counterclockwise direction, as viewed in FIG. 2, so that the prongs 44 of the arm 42 move the plate 34, shaft 18 and turret 16 downwardly in order to disengage the gear 28 from the gear 26 of the locking device 24. When the locking device 24 is disengaged, the gear 28 assumes a position which is shown in FIG. 5, i.e., this gear can rotate with reference to the gear 26 in response to rotation of the shaft 50. At such time, the gear teeth 56 of the supporting member 52 mate with the teeth of the indexing gear 58. Rotation of the gear 58 through a desired angle causes rotation of the turret 16 through an angle which is necessary to place a selected socket 20 into registry with the spindle S. When the lever 68 is thereupon caused to move the rack 62 forwardly, i.e., in a direction to the left, as viewed in FIG. 1, the cam 74 moves away from the follower 75 so that the package 36 of dished springs expands and returns the gear 28 into engagement with the gear 26 to thereby lock the turret 26 in the new angular position. As the lever 68 continues to move the rack 62 forwardly, the pusher 70 engages the head of that bolt 54 which is held in operative position and the bolt advances the saddle 10 and turret 16 until the forward end of the bolt engages the stop 14.

In order to insure that the tool which has completed removal of material from the workpiece W cannot leave on the workpiece scratches or other marks during retraction of the saddle 10, the machine tool of our invention further comprises means for effecting a relatively small movement of the tool in FIG. 2) radially of and away from the spindle S and workpiece W prior to retraction of the turret 16. FIG. 2 shows the tool 76 in its foremost position (i.e., closest to the axis of the workpiece W in the chuck C). Prior to retraction of the saddle 10 by way of the spring 72, the tip of the tool 76 is moved radially of and away from the workpiece W (downwardly, as viewed in FIG. 2) by a very short distance which can be only a fraction of a millimeter but is sufficient to permit the tip of the tool to bypass the workpiece during retraction. The tool 76 is a turning tool which is fixedly mounted in the holder 22 and removes material from the workpiece W while the spindle 8 rotates. The means for disengaging the tool 76 from the workpiece W comprises a fluid-operated assembly having a cylinder 78 whose piston rod 80 which can engage a third arm 82 of the disengaging lever 38. When the lower chamber (as viewed in FIG. 2) of the cylinder 78 receives a pressure medium by way of an inlet port 78a which is controlled by a solenoid-operated valve 78b**'the piston moves the piston rod 80 upwardly to pivot the arm 82 in a counterclockwise direction whereby the shaft 18 moves downwardly and the tip of the tool 76 is moved away from the workpiece W. As stated above, such radial displacement of the tool 76 may be only a small fraction of a millimeter.

The locking device 24 is designed in such a way that the gears 26,28 remain in partial engagement during and subsequent to movement of tool 76 away from the workpiece W. Thus, the turret 16 cannot change its angular position during movement of the saddle 10 toward retracted position. As shown in FIGS. 3 and 4, one tooth member 84 of the gear 26 is movable in parallelism with the axis of the shaft 18 and carries a retainer 86 which is biased by a helical spring 90 installed in a recess 88 of the housing H. When the tool 76 removes material from the workpiece W, the gears 26, 28 are in full mesh (FIG. 3) and the package 36 of dished springs maintains the movable tooth member 84 in depressed position so that the spring 90 stores energy. When the piston rod 80 of the cylinder 78 effects slight pivotal movement of the lever 38 to move the tip of the tool 76 away from the workpiece W, the gear 28 assumes the partly disengaged position shown in FIG. 4; the spring 90 then expands and urges the movable tooth member 84 of the gear 26 into the adjacent tooth space of the gear 28 to prevent indexing of the turret 16 during retraction of the saddle 10. The conical tip of the movable tooth member 84 can fit snugly between the adjacent teeth of the gear 28. It is clear that the tooth member 84 can constitute a movable tooth of the gear 28 or that the gear 28 and/or 26 can be provided with one or more movable teeth. FIG. 5 shows that, when the gears 26, 28 are fully disengaged, the conical part of the movable tooth member 84 does not project beyond the remaining teeth of the gear 26 because the retainer 86 then abuts against the gear 26. The main purpose of the tooth 84 is to prevent wobbling of the turret 16 when the gear 28 is moved to the partly disengaged position of FIG. 4.

The details of the feeding unit 60 for the saddle 10 and turret 16 are shown in FIG. 6. The lower arm of the lever 68 has a roller follower 68a which extends into the circumferential groove 92a of the cylinder cam 92. The latter is rotatable on but cannot move axially of a shaft 94 which can be driven by a reversible-pole electric AC motor 96 through the intermediary of a gear train including spur gears 98, 100. The motor serves to effect rapid traverse of the saddle 10.

The cylinder cam 92 rotates the indexing gear 58 by way of an eccentrically mounted roll 102 which cooperates with a Geneva wheel 104. The right-hand portion 106 of the wheel 104 constitutes a gear which meshes with the indexing gear 58. When the saddle 10 dwells in the retracted position in which the teeth 56 of the supporting member 52 mesh with the indexing gear 58, the cam 92 is rotated to change the angular position of the Geneva wheel 104 whereby the latter indexes the turret 16 by way of the parts 106, 58, 52, 50, 48, 46 and 18.

The feeding unit 60 further includes an electric DC motor 108 which is started and arrested in accordance with a predetermined schedule by way of a potentiometer installed in a control panel (not shown). The motors 96, 108 can drive the cam 92 (either simultaneously or independently of each other) through the intermediary of a planetary transmission 110 which includes a ring gear 112 in the form of a worm gear and a sun gear 114 which is a pinion provided on the shaft 94. The planet pinions 116, 118 of the transmission 110 mesh with the gears 112, 114, and are rotatably mounted on the cam 92, i.e., the cam 92 constitutes the planet carrier of the transmission 110. The cam 92 is provided with endless circumferential grooves 120 which can receive circumferentially adjustable actuating members or trips (not shown) for electric switches installed in a switch box 122. The trips actuate the associated switches in predetermined angular positions of the cam 92, i.e., in predetermined positions of the saddle 10. The control system of the machine tool further comprises a timer 59 which is driven by the indexing wheel 58 to produce signals indicating the angular positions of the turret 16 and serving to transmit such signals by way of a suitable distributor (not shown) to selected trips in the grooves 120.

A potentiometer 109 on the saddle 10 (see FIG. 1) serves to produce signals in dependency on the position of the saddle. Such signals, together with signals from the switch box 122 and from the aforementioned distributor, serve to regulate the operation of motors 96, 108 in a preselected sequence, either simultaneously or independently of each other. The signals serve to start, brake and arrest the motor 96 and/or 108 so as to insure rotation of the cam 92 at preselected intervals and at desired speeds. The motor 108 effects slower feeding movements of the saddle 10.

The numeral 124 denotes the shaft of the worm which cooperates with the worm wheel (ring gear) 223 of the transmission 110. The motor 108 can drive the shaft 124 at several speeds, for example, at two speeds. To this end, the feeding unit 60 further comprises a first additional transmission including gears 126, 128 which can rotate the shaft 124 (and hence the cam 92) at a higher speed and a second additional transmission including gears 130, 132 which can rotate the shaft 124 and cam 92 at a lower second speed. The motor 108 is of the variable-speed type so that the cam 92 can be driven at a lower speed within a wide speed range and at a higher speed, also within a wide speed range. The speed of the cam 92 within each of these ranges can be varied infinitely by changing the speed of the motor 108.

The feeding unit 60 further comprises two clutches 134, 136 which can respectively establish a driving connection between the shaft 124, on the one hand, and gears 126, 128 or 130, 132, on the other hand. A brake which serves to arrest the shaft 234 is shown at 138.

The feeding unit 60 can be modified in a number of ways without departing from the spirit of our invention. For example, the motors 96, 108 can transmit to the cam 92 torque through a single shaft. The worm wheel 112 and gear 100 are then rotatable on such single shaft and clutches are provided to drive the single shaft from the wheel 223 and/or gear 100.

Furthermore, and since the rack 62 is mounted for reciprocatory movement between two fixed end positions, i.e., since the lever 68 always oscillates between two predetermined angular positions, the feeding unit 60 can be replaced, for example, by a unit which includes a double-acting cylinder whose piston rod is coupled to the lever 68 or directly to the rack 62 and is capable of moving the rack at two or more speeds so as to effect rapid traverse and slower feeding movements of the carriage 10 from its retracted position to the forward position determined by that bolt 54 which has been indexed to operative position of registry with the stop 14. Thus, the cam 92 and lever 68 form part of but one of several units which can be employed to move the rack 62 or an analogous driving member between two predetermined end positions. The aforementioned double-acting cylinder can receive a hydraulic or pneumatic pressure medium through a system of conduits wherein the flow of pressure medium is controlled by suitable valves which can cause the piston rod to perform strokes at a desired speed, depending on the desired rapid traverse speed of the carriage and on the desired speed at which the carriage moves while the tip of a tool 76 engages the workpiece W which is rotated by the work-supporting means C, S. Such double-acting cylinder and the aforementioned control valves then replace the cam 92 and the two prime movers 96, 108 of which the prime mover 96 serves to effect rapid traverse and the prime mover 108 serves to effect slower feed movements of the saddle 10 toward the work spindle S.

The importance of that feature of our machine tool that the rack 62 is movable with as well as relative to the saddle 10 will be readily understood. Thus, depending on the axial position of that bolt 54 which registers with the stop 14, the pusher 70 of the rack 62 will begin to move the saddle 10 from retracted position practically immediately after the rack 62 leaves its rear end position or with a certain delay following such movement of the rack. In other words, by the simple expedient of placing the bolts 54 in predetermined axial positions with reference to the supporting member 52, the operator of the machine tool can determine the forward position of the saddle 10 in each angular position of the turret 16 to insure that the tool whose holder is in operative position can remove material during a preselected portion of forward movement of the saddle 10 and turret 16. At least one of the bolts 54 can be moved to such axial position with reference to the supporting member 52 that its head is engaged by the pusher 70 as soon as the rack 62 leaves its rear end position. At least one bolt 54 can also assume such axial position that the saddle 20 shares only a relatively small portion of forward movement of the rack 62 from its rear to its forward end position.

It is also clear that the gear 106 shown in FIG. 6 need not form an integral part of the Geneva wheel 104. If desired or necessary, the wheel 104 can rotate the indexing gear 58 through a gear train including two or more gears or other torque transmitting means, as long as the parts 16, 18, 46, 48, 50, 52 and 54 are indexed at a desired speed and through desired angles when the saddle 10 dwells in its retracted position or is close to such retracted position (in which the projection 10a abuts against the stop 14).

Still further, it is equally within the purview of our invention to index the turret 16 by a mechanism (e.g., including a system of cams) which need not derive motion from the supporting member 52 for the bolts 54. For example, the machine tool may include an indexing mechanism which is programmed to index the turret 16 at desired intervals in synchronism with indexing of the supporting member 52 but not through the intermediary of the shaft 50. However, the structure shown in the drawings has been found to be particularly simple, compact and inexpensive in addition to the fact that it insures full synchronization between indexing movements of the supporting member 52 and turret 16. The same applies for the disengaging means which serves to render the locking device 24 ineffective preparatory to indexing of the turret 16. Such disengaging means need not receive motion from or include a portion 74 of the rack 62 because it is equally possible to employ a system of cams which automatically disengage the locking device 24 when the saddle 10 approaches or assumes its retracted position. An advantage of the illustrated disengaging means (including the lever 38 and the cam 74) is that the locking device 24 is automatically disengaged in predetermined positions of the rack 62 and saddle 10. Since the locking device 24 is preferably disengaged when the saddle 10 dwells in the retracted position, the cam 74 is mounted in such a way that it pivots the lever 38 in a direction to disengage the gear 28 from the gear 26 when the rack moves with reference to the saddle, i.e., while the rack approaches its rear end position.

The aforementioned displacing means including the cylinder 78 serves the important purpose of insuring that the tools 76 can treat workpieces W to a high degree of precision finish and that such finish remains intact during retraction of the saddle 10 and during subsequent indexing of the turret 16 to place a fresh tool into operative position. Since the cylinder 78 effects partial disengagement of the gear 28 from the gear 26 4) by way of the arm 82 of the lever 38, this lever forms part of the disengaging means for the locking device 24 as well as of the displacing means which prevents scratching of workpieces during retraction of the saddle 10.

The main purpose of the movable tooth member 84 of the gear 26 is to prevent any, even minimal, angular movements of the turret 16 while the tool 76 is moved radially of and away from the work-supporting means C, S. Experiments with our machine tool have shown that such blocking of rotation or wobbling of the turret 16 contributes significantly to the quality of surface finish on the workpieces because the tips of tools 76 are held against all but radial movement with reference to the workpiece W while the assembly 78 causes the lever 38 to effect partial disengagement of the gear 28 from the gear 26.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What we claim as new and desired to be protected by Letters Patent is set forth in the appended

1. In a machine tool, particularly in an automatic turret lathe, a combination comprising a frame; a carriage reciprocably mounted in said frame for movement between a retracted position and a plurality of forward positions; a feeding unit for reciprocating said carriage, including a driving member reciprocable between two end positions and a mechanisms for moving said driving member whereby the latter moves said carriage from retracted position to one of said forward positions during movement from one to the other end position thereof; stop means provided on said frame; indexible supporting means provided on said carriage, and a plurality of adjustable abutments provided on and each movable by said supporting means to an operative position of registry with said stop means and in the path of movement of said driving member from said one to said other end position whereby the driving member entrains the carriage from retracted position to that forward position in which the abutment which dwells in said operative position engages said stop means.

2. A combination as defined in claim 1, wherein said driving member is reciprocable in parallelism with the direction of movement of said carriage and comprises pusher means operative to move said carriage from retracted position by way of that abutment which dwells in said operative position while said driving member moves from said one toward said other end position thereof.

3. A combination as defined in claim 2, wherein said driving member is a toothed rack and said mechanism comprises an oscillatable lever having a toothed portion meshing with said rack.

4. A combination as defined in claim 1, further comprising a tool support mounted on said carrier and indexible to a plurality of positions, one for each of said abutments, and means for indexing said tool support. 5. A combination as defined in claim 4, further comprising locking means provided on said carriage and operative to hold said tool support against indexing movement with reference to said carriage, at least when the carriage assumes one of said forward positions.

6. A combination as defined in claim 4, wherein the means for indexing said tool support is responsive to indexing of said supporting means.

7. A combination as defined in claim 6, wherein the means for indexing said tool support comprises a shaft rotatably mounted in said carriage and rigid with said supporting means.

8. A combination as defined in claim 7, wherein said supporting means comprises gear teeth and further comprising means for indexing said supporting means including a gear meshing with said gear teeth, at least in the retracted position of said carriage.

9. A combination as defined in claim 5, further comprising disengaging means operative to disengage said locking means so as to permit indexing of said tool support in retracted position of said carriage.

10. A combination as defined in claim 9, wherein said disengaging means includes a portion of said driving member.

11. A combination as defined in claim 10, wherein said driving member is movable with reference to said carriage during travel toward said one end position thereof and wherein said portion of said driving member is operative to effect disengagement of said locking means during movement of said driving member with reference to said carriage.

12. A combination as defined in claim 5, wherein said tool support includes a turret having a shaft rotatably and axially movably mounted in said carriage, said locking means comprising a first gear secured to said carriage, a second gear secured to said tool support, and biasing means for urging the shaft of said turret to an axial position in which said second gear meshes with said first gear.

13. A combination as defined in claim 12, further comprising disengaging means for moving said second gear away from mesh with said first gear to thus permit indexing of said turret, said disengaging means comprising a lever pivotably mounted in said carriage and having an arm operative to move said shaft axially and to thereby move said second gear away from said first gear against the opposition of said biasing means in response to pivotal movement of said lever in a predetermined direction.

14. A combination as defined in claim 13, wherein said lever comprises a second arm provided with follower means and said driving member comprises cam means operative to pivot said lever is said predetermined direction by way of said follower means in response to movement of said driving member with reference to said carriage.

15. A combination as defined in claim 5, further comprising rotary work-supporting means, said tool support comprising a turret arranged to carry a plurality of tool holders and to maintain one such tool holder in a predetermined position with reference to said work-supporting means in each position of said tool support.

16. A combination as defined in claim 15, further comprising displacing means for moving the tool holder which dwells in said predetermined position substantially radially of and away from said work-supporting means.

17. A combination as defined in claim 16, further comprising disengaging means operative to disengage said locking means in retracted position of said carriage, said displacing means being operative to move tool holders away from said work-supporting means by way of said disengaging means.

18. A combination as defined in claim 17, wherein said tool support further comprises a shaft coaxially secured to said turret and rotatably and axially movably mounted in said carriage, said turret being arranged to move the tool holder which dwells in said predetermined position away from said work-supporting means in response to axial movement of said shaft in one direction, said locking means comprising a first gear fixed to said carriage, a second gear fixed to said tool support, and biasing means for biasing said shaft in the other axial direction to thereby maintain said second gear in mesh with said first gear, said disengaging means comprising a lever pivotably mounted in said carriage and having an arm operative to move said shaft in said one direction against the opposition of said biasing means in response to pivotal movement of said lever in a predetermined direction, said displacing means comprising an assembly for pivoting said lever in said predetermined direction.

19. A combination as defined in claim 18, wherein said disengaging means further comprises means for pivoting the lever in said predetermined direction independently of said assembly in response to movement of said driving member with reference to said carriage and to such an extent that said second gear is completely disengaged from said first gear, said assembly being operative to pivot said lever to an extent necessary to effect partial disengagement of said second gear from said first gear.

20. A combination as defined in claim 19, wherein at least one of said gears comprises a portion which is movable with reference to said one gear and means for biasing said portion into engagement with the other gear when said gears are partially disengaged from each other on operation of said assembly to thus prevent angular displacement of said turret.

21. A combination as defined in claim 20, wherein said portion of said one gear is a tooth member having a conical part which engages two adjacent teeth of other said gear when the second gear is partially disengaged from said first gear, said one gear further comprising means for holding said tooth member against movement beyond the other teeth of said one gear when said second gear is completely disengaged from said first gear so that the tooth member cannot interfere with indexing movements of said tool support.

22. A combination as defined in claim 19, wherein said assembly includes a fluid-operated cylinder having a portion movable into engagement with said lever to pivot the latter in said predetermined direction.

23. A combination as defined in claim 1, wherein said driving member comprises a toothed rack which is reciprocable in parallelism with the direction of movement of said carriage and wherein said mechanism comprises a rotary cylinder cam having a cam groove, a lever pivotably supported by said frame and including a first arm having a toothed portion meshing with said rack and a second arm having a follower engaging said cam groove, and drive means for rotating said cam at a plurality of speeds, said drive means comprising a plurality of prime movers.

24. A combination as defined in claim 23, wherein one of said prime movers comprises a reversible-pole electric AC motor and the other of said prime movers comprises a variable-speed electric DC motor.

25. A combination as defined in claim 23, further comprising a worm drive interposed between one of said prime movers and said cam.

26. A combination as defined in claim 25, further comprising at least one transmission interposed between said one prime mover and said worm drive and clutch means operative to connect said transmission with said one prime mover.

27. A combination as defined in claim 25, further comprising a planetary transmission interposed between said worm drive and said cam, said worm drive including a worm wheel which constitutes the ring gear of said planetary transmission.

28. A combination as defined in claim 27, wherein said cam constitutes the planet carrier of said planetary transmission.